United States Patent [19]
Fletcher

[11] Patent Number: 5,738,761
[45] Date of Patent: Apr. 14, 1998

[54] SEWAGE TREATMENT PROCESS AND APPARATUS

[75] Inventor: Ronald B. Fletcher, Kelowna, Canada

[73] Assignee: Haron Research Corporation, Kelowna, Canada

[21] Appl. No.: 588,570

[22] Filed: Jan. 18, 1996

Related U.S. Application Data

[63] Continuation-in-part of Ser. No. 377,036, Jan. 23, 1995, abandoned.

[30] Foreign Application Priority Data

May 9, 1994 [CA] Canada ................................ 2123175

[51] Int. Cl.⁶ .................................................. B01D 3/00
[52] U.S. Cl. ........................ 203/10; 159/24.1; 159/28.6; 159/47.3; 202/176; 202/181; 203/11; 203/24; 203/39; 203/47
[58] Field of Search ..................... 202/182, 177, 202/176, 181; 159/24.1, 24.2, 47.3, 905, 28.6; 203/10, 24, 47, 22, 26, 11, 1, 39, DIG. 25

[56] References Cited

U.S. PATENT DOCUMENTS

| | | |
|---|---|---|
| 2,151,079 | 3/1939 | Bowen . |
| 2,441,361 | 5/1948 | Kirgan . |
| 2,760,919 | 8/1956 | Latham, Jr. . |
| 3,026,261 | 3/1962 | Mayfield et al. . |
| 3,121,940 | 2/1964 | Cospen . |
| 3,141,500 | 7/1964 | Raskin . |
| 3,362,458 | 1/1968 | Hopper . |
| 3,366,158 | 1/1968 | Rosenblad . |
| 3,409,067 | 11/1968 | Dunklin et al. . |
| 3,503,433 | 3/1970 | Riva et al. . |
| 3,725,205 | 4/1973 | Heen . |
| 4,180,129 | 12/1979 | Sumitomo . |
| 4,403,652 | 9/1983 | Schiltz et al. . |
| 4,585,523 | 4/1986 | Giddings . |
| 4,698,136 | 10/1987 | El-Allawy . |

*Primary Examiner*—Timothy McMahon
*Attorney, Agent, or Firm*—Murray E. Thrift; Adrian D. Battison

[57] ABSTRACT

A waste water treatment system includes a preliminary first stage separator for separating an aqueous phase from other materials. A pressure vessel sedimentation follows for removing most of the remaining solids from the waste material. The liquid and a minor fraction of the solids then pass on to an evaporation vessel where the water vapor is removed, compressed and passed through a condenser inside the evaporator vessel to recycle heat in the evaporator. The condenser is a stacked plate heat exchanger of unique design with the plates separated by steam gaskets and water gaskets to provide a very high heat transfer surface area to volume ratio. The condensate from the condenser passes through a second heat exchanger that heats the liquid flowing into the evaporator. The effluent water is purified by the evaporation. The residual solids may be heat treated to evaporate residual moisture and to sterilize the solids using a steam-jacketed auger. The resultant solids may be used as fertilizer.

9 Claims, 4 Drawing Sheets

SEWAGE TREATMENT PROCESS AND APPARATUS

CROSS REFERENCE TO RELATED APPLICATION

This application is a continuation-in-part of application Ser. No. 08/377,036, filed 23 Jan. 1995 abandoned.

FIELD OF THE INVENTION

The present invention relates to the treatment of contaminated waste water, including industrial pollutants and sewage, and particularly to apparatus used in such treatment.

BACKGROUND

Planet Earth should be our most prized possession. However, each and every day our environment is being polluted to a greater extent with industrial waste and human sewage.

Cities and towns, when economically feasible, do employ primary and secondary waste water treatment methods. However, the effluent from these methods is often still a contaminant that cannot be discharged to surface or subsurface waters without contaminating or reducing the quality of the carrier or solvent waters.

Coastal cities pipe so-called secondary treatment effluents miles into the ocean and discharge them as deeply as possible in hopes of reducing pollution by dilution. Inland cities, where possible, discharge effluents deeply into lakes and rivers. To date, there has been no economically feasible way to purify sewage.

The invention disclosed herein includes an apparatus which can economically treat sewage and contaminated waters to a high degree of purity. Preferably, treated water is of sufficient purity that it may be used for human consumption.

It is an objective of this invention to achieve the aforementioned treatment without the use of chemicals, thereby eliminating chemical pollution from the treatment and reducing operating costs. This is achieved using a distillation process. Known distillation apparatus has not been effective for this application because of the requirement for high energy input. The invention provides a solution to this problem.

The capacity or throughput volume of any distillation process is directly proportional to heat transfer surface area.

i.e.: $Q = AUT_{LM}$ where
Q=quantity of heat transfer
A=heat transfer area
U=heat transfer coefficient
$T_{LM}$=log mean temperature difference "A" becomes the most important factor with respect to capital and operating costs as it represents in excess of fifty percent of total plant costs.

The challenge is therefore to develop a less costly method of supplying the requisite heat-transfer area in a design that would allow the enlargement of that area to the extent that an evaporation system becomes practical for waste water treatment.

SUMMARY

According to one aspect of the present invention there is provided a condensing heat exchanger comprising a plurality of parallel, flat plates and gaskets separating adjacent ones of the plates, wherein:

the plates and gaskets comprise:
vapor plenum means extending through the plates and the gaskets; and
condensate collection passage means extending through the plates and gaskets;
alternate ones of the gaskets are vapor gaskets, each defining a condensation chamber between the adjacent plates, the condensation chamber communicating with the vapor plenum means for receiving vapor therefrom and with the condensation collection passage means for delivering condensate thereto; and
the remaining gaskets are liquid gaskets, each defining a liquid heating chamber between the two adjacent plates, and each having openings therein defining inlet port means for admitting liquid into the liquid heating chamber and outlet port means for releasing heated liquid from the liquid heating chamber.

This configuration of heat exchanger may be used very effectively as an internal heat exchanger in an evaporator because of the high heat transfer area compared with the overall volume of the exchanger.

Thus, according to another aspect of the present invention there is provided a waste water treatment evaporator comprising:

a closed vessel;
a waste water inlet to the vessel;
a water vapor outlet from the vessel;
pump means for pumping water vapor from the water vapor outlet;
a first heat exchanger within the vessel comprising a plurality of parallel, flat plates and gaskets separating adjacent ones of the plates, and wherein:
the plates and gaskets comprise
vapor plenum means extending through the plates at the gaskets;
condensate collection passage means extending through the plates and gaskets;
alternate ones of the gaskets are vapor gaskets, each defining a condensation chamber between the adjacent plates, the condensation chamber communicating with the vapor plenum means for receiving vapor therefrom and with the condensation collection passage means for delivering condensate thereto; and
the remaining gaskets are liquid gaskets, each defining a liquid heating chamber between the two adjacent plates, and each having openings therein defining inlet port means for admitting liquid into the liquid heating chamber and outlet port means for releasing heated liquid from the liquid heating chamber;
a vapor conduit connected to the pump means and the vapor plenum means for delivering water vapor from the pump means to the vapor plenum means;
an outlet duct connected to the condensate collection passage means for discharging condensed water vapor; and
a second heat exchanger externally of the vessel and having a first heat exchange passage for waste water upstream of the waste water inlet to the vessel and a second heat exchange passage for condensed water vapor downstream from the vessel.

The apparatus heats the waste water to vaporize water component. Heat recovery from the condensed water vapor in the two heat exchangers makes the apparatus economically effective to operate.

The internal heat exchanger in the evaporator exceeds all known evaporator internal exchangers with respect to:

1. the ratio of heat transfer area to volumetric size;
2. capital cost.

The present internal heat exchanger may, for example, be constructed with an overall volumetric size of 20 cubic feet with a heat transfer area of 1050 square feet, providing a ratio of 52 square feet per cubic foot.

A comparative tube and shell exchanger with a volumetric size of 20 cubic feet would have 314 square feet of surface area or a ratio of 15.7 square feet per cubic foot.

With respect to costs, the reduction is greater than fifty percent thereby potentially allowing competition with conventional treatment methods.

BRIEF DESCRIPTION OF THE DRAWINGS

In the accompanying drawings, which illustrate an exemplary embodiment of the present invention.

FIG. 5 is a detail showing the dimple type spacers.

DETAILED DESCRIPTION

Figure 1:
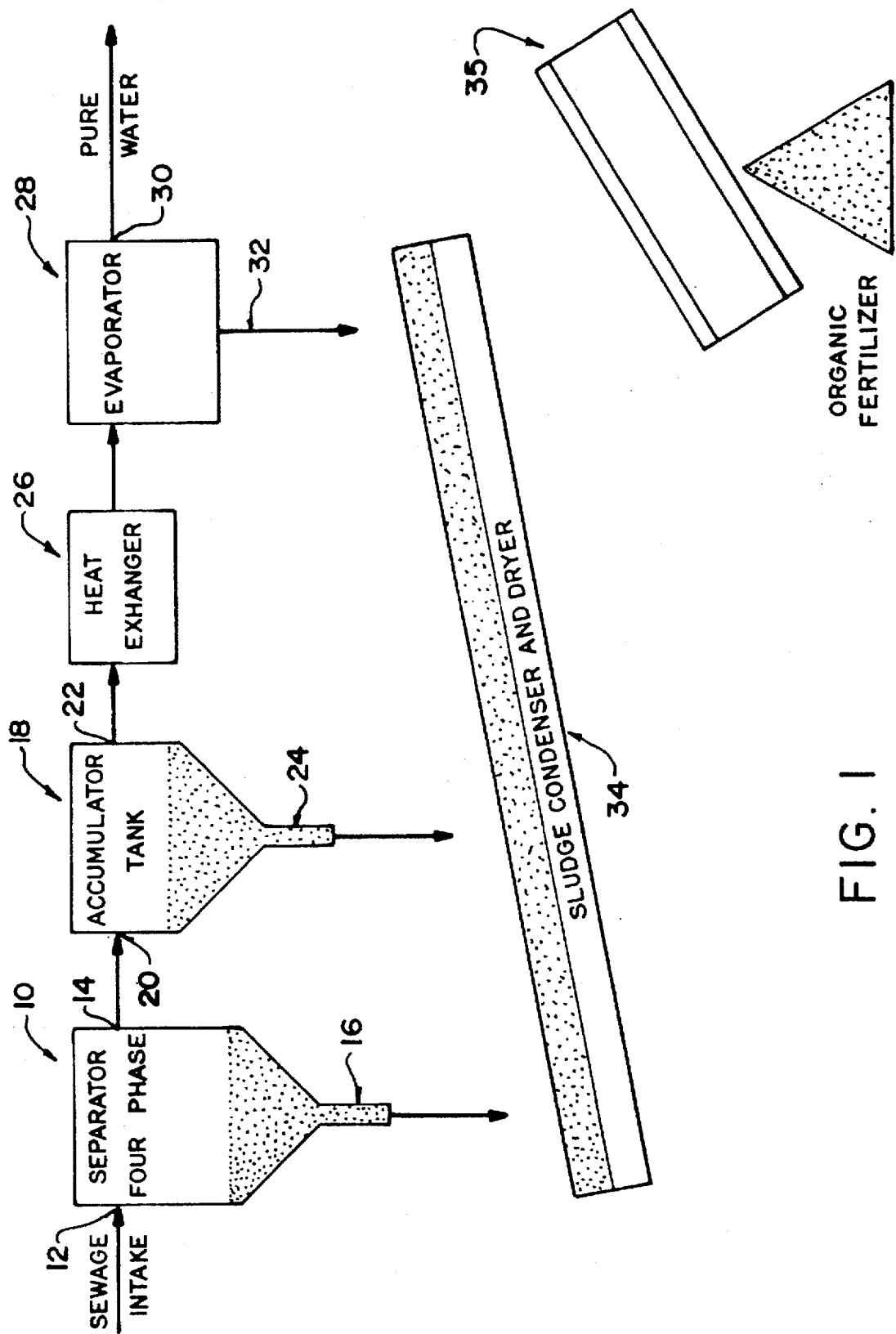
FIG. 1 is an overall schematic illustrating the process and apparatus.

Referring to the accompanying drawing, especially FIG. 1, there is illustrated a multi-stage waste water purification system. In the first stage a separator 10 receives raw waste water through an inlet 12. The waste water is subjected to a four-phase separation in which gases, solids and water immiscible liquids such as oils are separated from the water borne fraction of the waste. As will be appreciated, this is not a complete separation of all suspended matter but rather a preliminary separation stage. Subsequently, the water based waste is withdrawn through an outlet 14. The solids are discharged through an outlet 16.

The liquid component withdrawn from the separator 10 is passed to an accumulator tank 18 through its inlet 20. A further liquid-solid separation is carried out by gravity settling in the accumulator tank. The liquid is withdrawn through an outlet 22, while settled solids are withdrawn through a solids outlet 24.

The liquid component from the accumulator tank is passed through a heat exchanger 26 to an evaporator vessel 28. This vessel is illustrated schematically as having a pure water outlet 30 and a solids outlet 32. The solid materials discharged from the separator, the accumulator tank and the evaporator are all collected on a sludge condenser and dryer 34 where they are dried for subsequent collection in a collector 35 for use as fertilizer.

Figure 2:
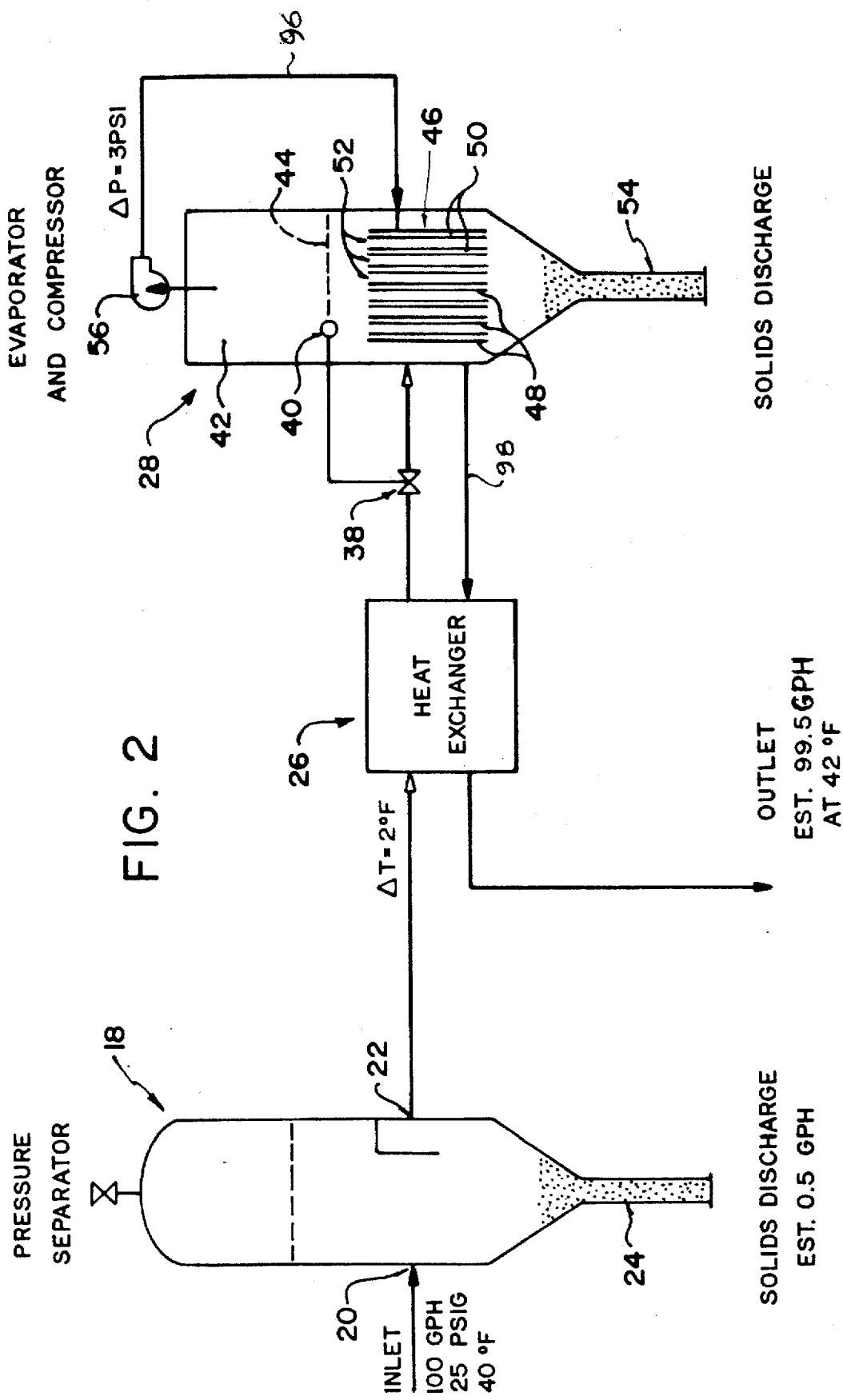
FIG. 2 is a detailed schematic illustrating the heat exchange and the evaporation portions of the system.

FIG. 2 illustrates the portion of the apparatus downstream from the separator 10. This includes the pressure separator 18 with its inlet 20 and bottom solids discharge 24. Liquid from the pressure separator passes through the heat exchanger 26 to the evaporator vessel 28.

The evaporator vessel has an inlet valve 38 that is controlled by a float or other level control 40 to maintain a constant liquid level in the evaporator. A head space 42 is provided above the liquid surface 44.

Submerged in the liquid in the evaporator vessel is a heat exchanger 46 composed of a series of thin walled plates 48. Alternate pairs of the plates are connected to provide condensation chambers 50 spaced apart by evaporation chambers 52. Evaporation chambers 52 are filled with the waste liquid in the evaporator. A solids outlet 54 is provided in the bottom of the evaporator to discharge solids that accumulate at the bottom of the evaporator.

A vapor pump 56 withdraws vapor from the head space 42 and compresses that vapor. The compressed vapor is returned to the evaporator vessel to pass through the condensation chambers 50 of the heat exchanger 46. In passing through the condensation chambers, the vapor is condensed, yielding its latent heat of vaporization to the incoming liquid waste. This recovers most of the heat expended in evaporating the water from the liquid waste into the head space 42 so that it may be withdrawn and compressed by the pump 56. From the heat exchanger 46, the condensate passes to the heat exchanger 26, where it yields further heat to the incoming liquid waste.

The evaporator 28 is equipped with appropriate instrumentation and controls to allow its operation at various desired pressures and temperatures.

A vortex breaker is provided at the inlet to the vapor pump or compressor 56 to prevent any cyclonic action within the head space of the evaporator. This ensures that an equal vapor pressure is exerted over the entire liquid-vapor interface.

Figure 3:
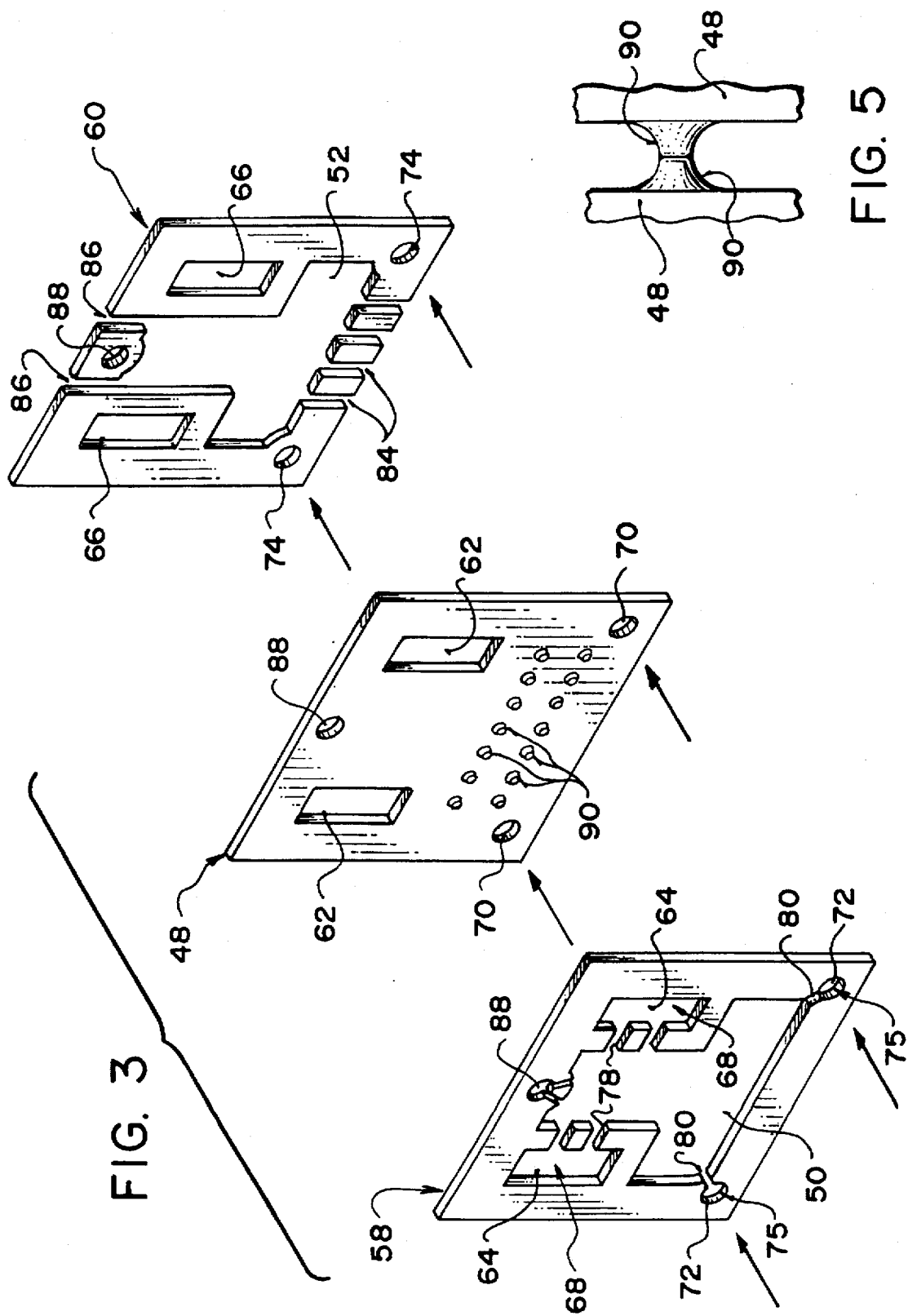
FIG. 3 is an exploded view showing the components of the internal heat exchanger.
Figure 4:
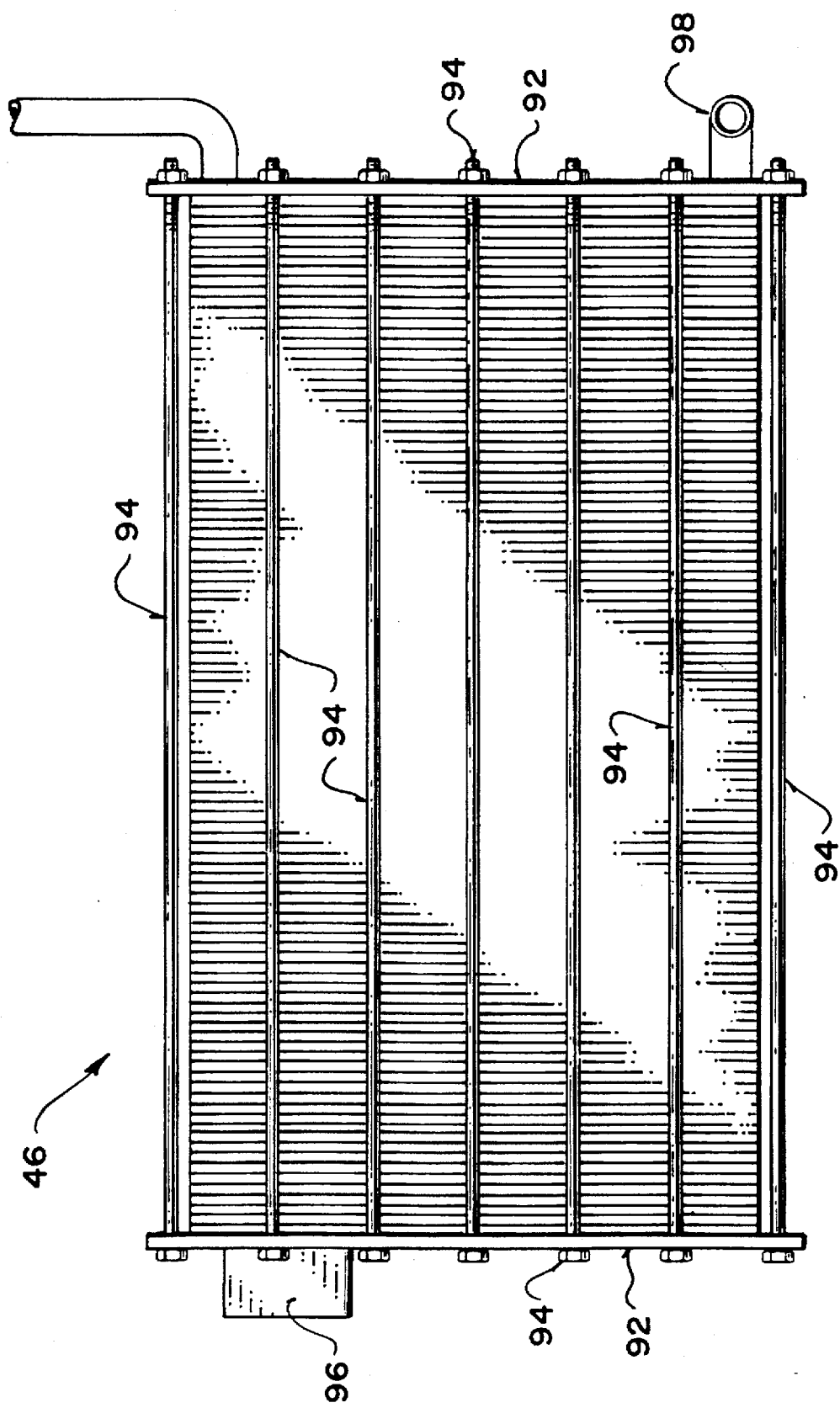
FIG. 4 is a side view of the internal heat exchanger.

The internal heat exchanger 46 is constructed as illustrated in FIGS. 3 and 4. As shown especially in FIG. 3, adjacent plates 48 are separated by steam gaskets 58 and water gaskets 60, with the steam gaskets alternating with the water gaskets. Each plate has two steam openings 62 that align with steam openings 64 and 66 in the steam and water gaskets respectively. The stack of plates and gaskets then has two steam plenums 68 that extend the length of the heat exchanger. These are located at the upper corners of the plates and gaskets. At the lower corners of the plates are condensate apertures 70 which align with condensate apertures 72 and 74 in the steam and water gaskets to provide condensate passages 75 extending the length of the heat exchanger. The center of each steam gasket is open to provide the condensation chamber 50 between the adjacent plates 48. The condensation chamber communicates with the vapor plenums through vapor passages 78. It communicates with the condensate collection passages through condensate openings 80.

Each water gasket defines one of the liquid heating chambers 52 between the adjacent plates. Each chamber 52 is isolated from the vapor plenums and the condensate collection passages. At the bottom of each water gasket are water inlet ports 84 which allow water to enter the water heating chamber. At the top of the water gasket are two vapor outlets 86 which allow vaporized water to escape from the water heating chamber.

The gaskets and plates are also provided with aligned gas outlet openings 88, which communicate with the condensation chambers. These are located at the top of the gaskets and plates to collect non-condensable gases that may be introduced along with the steam. These gases are periodically bled from the system.

As illustrated in FIG. 3 and in the detailed view of FIG. 5, each of the plates has an array of dimples 90 that project into the water heating chambers 52. The dimples on adjacent plates engage one another to act as spacers, maintaining the thickness of the chamber against the higher steam pressure in the vapor condensation chambers.

As illustrated most particularly in FIG. 4, the complete heat exchanger is held together using end plates 92 and bolts 94. This packing of the plates and gaskets eliminates welding of the unit. The unit is also very flexible in size, since the number of plates and gaskets can be selected to suit most any size of installation.

In use of the heat exchanger, the plenums are pressurized with water vapor from the pump 56 through vapor conduit 96. From the plenums, steam passes through the gasket vapor passages to completely fill the condensation chambers 50. Heat is transferred through the plates to heat the liquid in the evaporation chambers 52. Condensate is collected in the condensate outlet passages 75 and delivered to the heat exchanger 26 through outlet duct 98.

In a computed example of the system, liquid enters the pressure vessel 18 at a flow rate of approximately 450 liters/hour, a pressure of about 170 kPa and a temperature of about 4.5° C. The pump 56 increases the pressure of the water vapor by approximately 20.7 kPa. The approximate water yield from the heat exchanger 26 is 447.8 liters/hour at 5.6° C. The temperature difference between the incoming waste water and the discharged, purified, treated water is about 1° C., a limited heat loss.

Returning to FIG. 1, the sludge dryer 34 is, in the preferred embodiment, a close tolerance auger with an auger tube having an inlet or inlets for receiving the solid sludge and close fitting auger flighting extending the length of the tube for delivering the sludge from the inlet to the outlet. The auger tube is fitted with a steam jacket so as to heat the sludge and drive off the moisture, so that the solid is dried and pasteurized prior to discharge.

While one embodiment of the present invention has been described in the foregoing, it is to be understood that other embodiments are possible within the scope of the invention.

I claim:

1. A condensing heat exchanger comprising a plurality of parallel, flat plates and gaskets separating adjacent ones of the plates, wherein:

each plate has at least one vapor opening therethrough and at least one condensate aperture therethrough;

each gasket has at least one vapor opening therethrough and at least one condensate aperture therethrough;

the plates and gaskets are stacked with the vapor openings aligned to comprise vapor plenum means extending through the plates and the gaskets and with the condensate apertures aligned to comprise condensate collection passage means extending through the plates and gaskets;

alternate ones of the gaskets are vapor gaskets, each having a condensation opening therein defining a condensation chamber between the adjacent plates, vapor inlet passage means between each vapor opening and the condensation opening to deliver vapor to the condensation chamber from the vapor plenum means, and condensation outlet passage means between the condensation opening and each condensate aperture to drain condensate from the condensation opening to the condensation collection passage means; and the remaining gaskets are liquid gaskets, each having a liquid heating opening therein defining a liquid heating chamber between the two adjacent plates, and each having liquid inlet openings defining inlet port means for admitting liquid into the liquid heating chamber, and liquid outlet openings defining liquid outlet port means for releasing heated liquid from the liquid heating chamber.

2. A heat exchanger according to claim 1 wherein the plates are metal plates.

3. A heat exchanger according to claim 1 including spacer means engaged between adjacent one of the plates in the liquid heating chamber.

4. A heat exchanger according to claim 3 wherein the spacer means comprise dimples formed in the plates, the dimples of adjacent plates engaging one another.

5. A heat exchanger according to claim 1 including clamping means clamping the plates and gaskets together.

6. A heat exchanger according to claim 1 wherein the vapor plenum means comprise two vapor passages extending through the plates and gaskets.

7. A waste water treatment evaporator comprising:

a closed vessel;

a waste water inlet to the vessel;

a water vapor outlet from the vessel;

pump means for pumping water vapor from the water vapor outlet;

a first heat exchanger within the vessel comprising a plurality of parallel, flat plates and gaskets separating adjacent ones of the plates, and wherein:

each plate has at least one vapor opening therethrough and at least one condensate aperture therethrough;

each gasket has at least one vapor opening therethrough and at least one condensate aperture therethrough;

the plates and gaskets are stacked with the vapor openings aligned to comprise vapor plenum means extending through the plates and the gaskets and with the condensate apertures aligned to comprise condensate collection passage means extending through the plates and gaskets;

alternate ones of the gaskets are vapor gaskets, each having a condensation opening therein defining a condensation chamber between the adjacent plates, vapor inlet passage means between each vapor opening and the condensation opening to deliver vapor to the condensation chamber from the vapor plenum means, and condensation outlet passage means between the condensation opening and each condensate aperture to drain condensate from the condesation opening to the condensation collection passage means; and the remaining gaskets are liquid gaskets, each having a liquid heating opening therein defining a liquid heating chamber between the two adjacent plates, and each having liquid inlet openings defining inlet port means for admitting liquid into the liquid heating chamber, and liquid outlet openings defining liquid outlet port means for releasing heated liquid from the liquid heating chamber;

a vapor conduit connected to the pump means and the vapor plenum means for delivering water vapor from the pump means to the vapor plenum means;

an outlet duct connected to the condensate collection passage means for discharging condensed water vapor; and a second heat exchanger externally of the vessel and having a first heat exchange passage for waste water upstream of the waste water inlet to the vessel and a second heat exchange passage for condensed water vapor downstream from the vessel.

8. An evaporator according to claim 7 including liquid level control means for maintaining a predetermined liquid level in the vessel, and wherein the plates are located below the liquid level so as to remain fully submerged in the liquid.

9. An evaporator according to claim 7 including a solids outlet for discharging solids from the vessel.

* * * * *